(No Model.) 7 Sheets—Sheet 1.

J. BÖHM.
MACHINE FOR TURNING BUTTONS.

No. 574,860. Patented Jan. 5, 1897.

Fig. 1.

WITNESSES
George W. Jackel
Geo. S. Wheelock

INVENTOR
Joseph Böhm
BY Goepel & Raegener
ATTORNEYS.

(No Model.) 7 Sheets—Sheet 3.

J. BÖHM.
MACHINE FOR TURNING BUTTONS.

No. 574,860. Patented Jan. 5, 1897.

WITNESSES.
George W. Jackel
Geo. L. Wheelock

INVENTOR
Joseph Böhm

BY
Joepel & Jaeguer
ATTORNEYS (No Model.) 7 Sheets—Sheet 5.

J. BÖHM.
MACHINE FOR TURNING BUTTONS.

No. 574,860. Patented Jan. 5, 1897.

Fig. 5.

WITNESSES:
George W. Jaikel
Geo. S. Wheelock

INVENTOR
Joseph Böhm

BY
Joseph Naegener
ATTORNEYS.

(No Model.) 7 Sheets—Sheet 6.

J. BÖHM.
MACHINE FOR TURNING BUTTONS.

No. 574,860. Patented Jan. 5, 1897.

WITNESSES:
George W. Jackel
Geo. L. Wheelock

INVENTOR
Joseph Böhm

BY
Joepel & Naegner
ATTORNEYS.

(No Model.) 7 Sheets—Sheet 7.

J. BÖHM.
MACHINE FOR TURNING BUTTONS.

No. 574,860. Patented Jan. 5, 1897.

WITNESSES:
George W. Jaekel
Geo. L. Wheelock

INVENTOR
Joseph Böhm

BY
Goepel & Raegener
ATTORNEYS.

UNITED STATES PATENT OFFICE.

JOSEPH BÖHM, OF NEW YORK, N. Y., ASSIGNOR, BY DIRECT AND MESNE ASSIGNMENTS, TO LIONEL SUTRO AND TILLIE BÖHM, OF SAME PLACE.

MACHINE FOR TURNING BUTTONS.

SPECIFICATION forming part of Letters Patent No. 574,860, dated January 5, 1897.

Application filed June 3, 1895. Serial No. 551,483. (No model.)

*To all whom it may concern:*

Be it known that I, JOSEPH BÖHM, a citizen of the United States, residing in the city, county, and State of New York, have invented certain new and useful Improvements in Machines for Turning Buttons, of which the following is a specification.

My invention relates to a machine for turning buttons, especially mother-of-pearl buttons, but the same may be adapted as well to the turning of buttons made of vegetable ivory, horn, animal ivory, or other material of like character.

My invention consists of certain features of construction and combinations of parts to be fully described hereinafter and then particularly pointed out in the claims.

In the accompanying drawings, Fig. 3 is a side elevation of the machine, looking toward the opposite side thereof. Fig. 6 is a detail sectional view taken longitudinally through two alined chucks of the backing and facing mechanism and showing a backed blank about to be transferred to the facing mechanism. Fig. 7 is a detail side view showing the chuck-opening devices for the backing mechanism, the rotary head and chucks being shown in broken lines. Fig. 8 is a similar view showing the chuck-opening device of the facing mechanism. Fig. 9 is a broken detail longitudinal section of the rotary head of the backing and facing mechanisms, showing the chucks arranged thereon. Fig. 10 is a side elevation of the perforating or drilling mechanism, the cam for operating the same being shown in dotted lines. Fig. 11 is a transverse section on line 11 11 of Fig. 10; and Fig. 12 is an end elevation of the drilling mechanism, the cam for operating the same being shown in dotted lines.

Similar letters of reference indicate corresponding parts.

In the drawings, A represents the frame of the machine, in which is journaled in suitable bearings the operating cam-shaft B, provided at one end with a worm-wheel $b$, that is in mesh with a worm $b'$, arranged on the main driving-shaft $b^2$, which may be rotated by a suitable pulley transmission $b^3$. The cam-shaft B carries all of the disk-shaped cams for operating the movable parts of the machine, said cams being lettered C, C', $C^2$, and $C^3$, respectively, the construction and function of which will be hereinafter particularly stated.

The mechanism to which the disks or blanks from which the buttons are to be turned are first introduced is composed of a toothed rotary head or gear-wheel D, which is mounted to one side of a central recess E in the upper part of the machine and is provided with a suitable shaft $d$, a series of chucks F, to be hereinafter particularly described, and a rotary backing-cutter G. The cutter G is suitably clamped on the end of the cutter-shaft $g$, which is journaled in bearings $g'$ of the machine, and at its outer end is provided with diametrically opposite studs $g^2$, which take into the forked end of an arm $h$, which is carried at the upper end of an oscillating shaft H, journaled in bearings $h'$. Through the medium of a spring $H^2$, coiled around the shaft and seated at one end in the bearing $h'$ and at the other end in a nut $h^3$, fixed to the oscillating shaft H, the backing-cutter G is normally retracted, while through the medium of an arm $h^4$ at the lower end of the vertical oscillating shaft H and a connecting-rod H', pivoted to the arm $h^4$ and extending from the side of the machine on which the backing-cutter is arranged to the opposite side of the machine, the cutter is projected forward toward the rotary head D when a pull is exerted on the connecting-rod H'. The connecting-rod H' is reciprocated by means of the cam C at one end of the cam-shaft B, through the medium of a lever $h^2$, pivoted at $H^3$, and provided with a roller $H^4$ at its lower end bearing on the cam-surface of the cam C, and an oscillating arm I, carried by an oscillating shaft $m^4$ and pivoted to the lever $h^2$ at $h^5$ and to the connecting-rod H' at $H^5$. The shaft $g$ of the backing-cutter G is kept continuously rotated by means of a belt G', which passes around a pulley $G^2$, fixed on said shaft.

Mounted on the face of the rotary toothed head D of the backing mechanism are the four chucks F, previously referred to. These chucks each have an outer shell $F'$ (see Fig. 6) and a split tube $F^2$, which is permanently screwed within the shell of the chuck at $f^0$ and is provided at the outer ends of the gripping-jaws $f^\times$, formed by the splitting of the same, with inclined surfaces $f$, so as to impart an outward taper to the ends of the jaws. The wedge-shaped end $f'$ of the tubular slide $f^2$, which moves within the space between the inner wall of the shell of the chuck and the split tube, bears upon the tapering gripping-jaws of the split tube and tends to draw the latter together through the medium of a spring $f^3$, coiled around the slide, which at one end seats against an externally-screw-threaded collar $f^4$, screwed in the outer end of the shell of the chuck, and at the other end bears upon the annular flange $f^5$ at the inner end of the slide. A movable pusher-block $f^6$ is arranged in the rear part of the shell $F'$ of each chuck and is adapted to actuate the slide by means of guide-pins $F^3$, which are guided in openings in the interior flange $f^8$, to which the screw-threaded portion of the split tube $F^2$ is screwed, said pusher-blocks being provided with beveled lugs $f^7$ at the back.

The beveled lugs $f^7$ are engaged alternately by beveled actuating-pieces $f^9 f^{10}$, fixed to the frame of the machine at diametrically opposite sides of the shaft of the rotary head D in line with the path of the said lugs. A plunger J is guided in an opening in a lug $j$ on the frame A of the machine, and is arranged at the upper end of a cam-lever $J'$, pivoted at $J^2$ on the frame, and provided at its lower end with an antifriction-roller $J^3$, upon which bears the peripheral cam-face of the cam $C'$, so that when the lever $J'$ is operated by the cam $C'$ the plunger is projected forwardly so as to act on the rear end of an auxiliary plunger $F^5$, mounted in the chucks. Screwed within the split tube or clutch member $F^2$ is a guide-tube $F^4$, which receives and guides the auxiliary plunger $F^5$, which is normally retracted through the medium of a spring $F^6$, coiled around the same within the enlarged interior of the tube $F^4$ and acting upon an annular shoulder $F^7$ on the auxiliary plunger, the latter being retained in position by a perforated screw-plug $f^{11}$, screwed into the rear end of the said tube. The auxiliary plunger is for the purpose of discharging the partly-turned button from the chuck after the operation of backing has been accomplished.

Journaled within a suitable bearing of the frame of the machine at the opposite side from the rotary head of the backing mechanism is a shaft K, which at its inner end carries a toothed rotary head or gear-wheel $K'$, forming part of the facing mechanism, and the face of which is presented toward the face of the rotary head D and is arranged at one side thereof. This toothed rotary head or gear-wheel $K'$ is caused to move simultaneously with the rotary head D of the backing mechanism through the medium of two pinions $k\ k'$, respectively fixed on a counter-shaft $k^0$, journaled in bearings $k^2\ k^3$ of the frame A, the teeth of the rotary head $K'$ being in mesh with the pinion $k$, while the teeth of the rotary head D are in mesh with the pinion $k'$, so that a simultaneous movement of both of the rotary heads is obtained. The rotary head of the facing mechanism is provided with four chucks L, substantially corresponding to the chucks F of the backing mechanism, but this number is not essential, as by timing the movements of the different mechanisms in a different manner, evident to any skilled mechanic, the number may be varied.

The description of the means of rotating the rotary head of the facing mechanism and chucks of the same will be made hereinafter.

The cutter M of the facing mechanism is arranged to move simultaneously with the cutter G of the backing mechanism through the medium of the following connections: $m$ is a rotary shaft journaled in bearings $m'$ on the frame of the machine and provided with means at one end for holding the cutter M and at the other end with diametrically opposite studs $m^2$, which take into the forked end of an oscillating arm $m^3$, fixed to the upper end of an oscillating shaft $m^4$, journaled in bearings $m^5$ on the side of the frame opposite to that on which the toothed rotary head $K'$ is arranged, said shaft bearing at its lower end the oscillating arm I previously referred to. Coiled around the oscillating shaft $m^4$ is a spring $m^6$, which at one end is fixed or seated in the bearing $m^5$, while its other end is fixed to a nut or collar $m^7$ on the oscillating shaft $m^4$. It will be seen, therefore, that through the medium of the cam C the oscillating shafts H and $m^4$ will be oscillated simultaneously, so as to project the respective cutters operated thereby inwardly toward the chucks in which the button-blanks are held for being backed and faced, while they are retracted outwardly, when the inactive portion of the cam C is in engagement with the end of the lever $h^2$, by means of the springs $H^2$ and $m^6$. The shaft $m$ of the facing-cutter M is kept in continuous rotation through the medium of the belt $M'$, which passes over a pulley $M^2$, mounted on the cutter-shaft, and as both of the cutter-shafts $g$ and $m$, respectively, are kept in continuous rotation it is only necessary that they be reciprocated at the proper moment to accomplish the work for which they are intended.

The chucks L, which are mounted on the rotary toothed head $K'$ of the facing mechanism, are constructed substantially the same as and in the main similarly to the chucks of the backing mechanism, and those parts which are operated in a similar manner and are identical with parts of the chucks of the backing mechanism receive the same reference-letters. The difference in the chucks L is that instead of a guide-pin being guided in the guide-tube $F^4$ a rigid guide-post $L'$ is screwed into a plug at the inner end of the guide-tube and has coiled around it a spiral spring $L^2$, which acts upon a movable follower $L^3$, of cup shape, which is guided on the post. The cavity of the follower $L^3$ permits the action of the drills on the button-blanks for the purpose of forming the perforations of the buttons.

The mechanism for the intermittent rotation of the rotary heads of the backing and facing mechanisms is composed of the following instrumentalities:

$C^2$ is the cam which operates the said parts, and the same engages the rear end of a cam-lever N, which is fulcrumed to a bracket in the lower part of the frame of the machine at $n$ and is pivoted at its front end to the lower end of a link $N'$, which in turn is pivoted at its upper end at $n'$ to a slide $N^2$, which has a dovetailed recess in its under side and is guided on a dovetailed projection $n^2$ on one side of the frame fitting into said recess. The vertical reciprocation of the slide caused by the action of the cam $C^2$ causes an intermittent rotation of a star-wheel $N^3$, which is mounted on the outer end of the tubular shaft K, through the medium of an actuating-arm $N^5$, which is pivoted at $n^4$ at its lower end to the upper end of the slide $N^2$. In order to effect the proper intermittent rotation of the star-wheel $N^3$, the upper end of the actuating-arm $N^5$ is provided with a laterally-extending pin $n^5$, which takes into the teeth of the star-wheel after each downward movement of the actuating-arm.

For holding the actuating-arm $N^5$ in positive forward engagement with the star-wheel $N^3$ the same is subjected to the constant forward pressure of a spring $N^0$.

To effect the locking of the rotary heads of the respective backing and facing mechanisms, a locking-pin O, which slides in an opening formed in the frame of the machine, is provided. Said locking-pin engages by its forward end in either of four sockets formed in the back of the rotary head $K'$. The co-operation of movement of the locking-pin O with the intermittent rotary movement obtained in the rotary head $K'$ is obtained through the medium of a lever $O'$, fulcrumed at $O^2$ within a recess in the dovetailed projection $n^2$, said lever $O'$ having at its lower end an angular recess $O^3$, which is presented outwardly, so that a spring-actuated catch $O^4$, which is pivoted at $O^5$ on the slide $N^2$, can project through an opening in the back of the slide and into said angular notch or recess $O^3$. The spring of catch $O^4$ can be applied in many different ways, but the same is not shown, as the application of the same is evident without detailed illustration. As the slide $N^2$ is lowered the catch $O^4$, when riding along the inclined face of the notch $O^3$, acts on the lever $O'$ so as to retract the locking-bolt O, but when the slide $N^2$ rises, as the catch $O^4$ is drawn out of the notch $O^3$, a spring $O^6$, which acts on said lever $O'$, effects the forward movement of the locking-bolt $O'$, so that it is projected into the socket in the back of the rotary head $K'$ which happens to be in line with the locking-bolt.

Having now described the construction of the parts which effectuate the working of the facing and backing mechanisms, I will proceed to a description of the construction of the drilling mechanism.

P represents a sliding carriage which at its under side is provided with a dovetailed projection $p$, which is guided in a correspondingly-dovetailed recess $p'$ in a bed-frame $A'$ on the upper part of the frame of the machine, and located to one side of the rotary head of the backing mechanism, but in front of the rotary head of the facing mechanism. The carriage P is reciprocated through the medium of a cam-lever $P'$, which is fulcrumed in the bed-frame $A'$ of the machine at $p^2$, the forked upper end of said cam-lever engaging with a projection on the carriage, while the lower end of the antifriction-roller which is mounted thereon engages with the peripheral cam-surface of the cam $C^3$.

It may as well here be stated that while the forward movements of the cam-levers are accomplished through the medium of their respective cams the return movements may be accomplished through the medium of suitable springs or weights in the usual manner, and it is not necessary to show the same. Fulcrumed at Q on the upper part of the carriage P is a rocking frame $Q'$, which in cross-section is angular or L-shaped, so as to provide an upright portion $q$ and a horizontal portion $q'$, which latter extends inwardly. Also mounted on the fulcrum of the rocking frame $Q'$ is a lever $Q^2$, that at its lower end carries an antifriction-roller $q^2$, upon which bears the lateral cam-shaped projection $C^5$, formed on one face of the cam $C^3$. While the peripheral cam-surface of the cam $C^3$ effects, through the medium of the cam-lever $P'$, the reciprocation of the carriage P, it is evident that by the cam-surface $C^5$ at the side of the cam $C^3$ the rocking of the rocking frame $Q'$ is accomplished through the lever $Q^2$. The upright portion $q$ of the rocking frame $Q'$ has journaled within the same the spindle R of one of the drills $R'$, while within the horizontal portion $q'$ of the rocking frame is journaled a spindle S of another drill $S'$. The spindles R and S are continuously rotated through the medium of a belt $R^2$, that passes over a pulley $R^3$, arranged on the spindle $R'$, a pulley $R^5$, also arranged on the spindle R, and a transmission-belt $R^4$, that passes over pulley $R^5$ and over another pulley $S^2$, which is mounted on the spindle S of the drill $S'$. It will be seen, therefore, that simultaneous rotation of the drills R' and S' is accomplished through the medium of the described transmission, but it is evident that by unshipping the transmission-belt R⁴ only the drill R' may be caused to rotate, if desired. By means of eccentric bushings or sleeves r, (see Fig. 13,) which are arranged outside the spindles R and S and can turn in the bearings for the spindles, the axial position of said spindles with respect to the rocking frame may be changed or adjusted by shifting or slightly rotating the eccentric bushings. This adjustment is accomplished by an inclined worm-shaft T, which is mounted in bearings $t$ $t$ of the rocking frame, and is provided with nuts $t^2$ for rotating the same, so that through the medium of the worms $t^3$ thereon, which take into worm-wheels T' T², respectively, of the upper and lower drill-spindles R S, (that turn in the eccentric bushings or sleeves,) the bushings may be slightly rotated and the axial position of the spindles in the rocking carriage, and the position of said drills with relation to the button-blanks which are held by the facing mechanism, changed. Several other simple but important parts of the mechanism of the machine have not been described, but they will be referred to in the description of the operation of the properly-timed instrumentalities thereof, which now follows.

Figure 1:
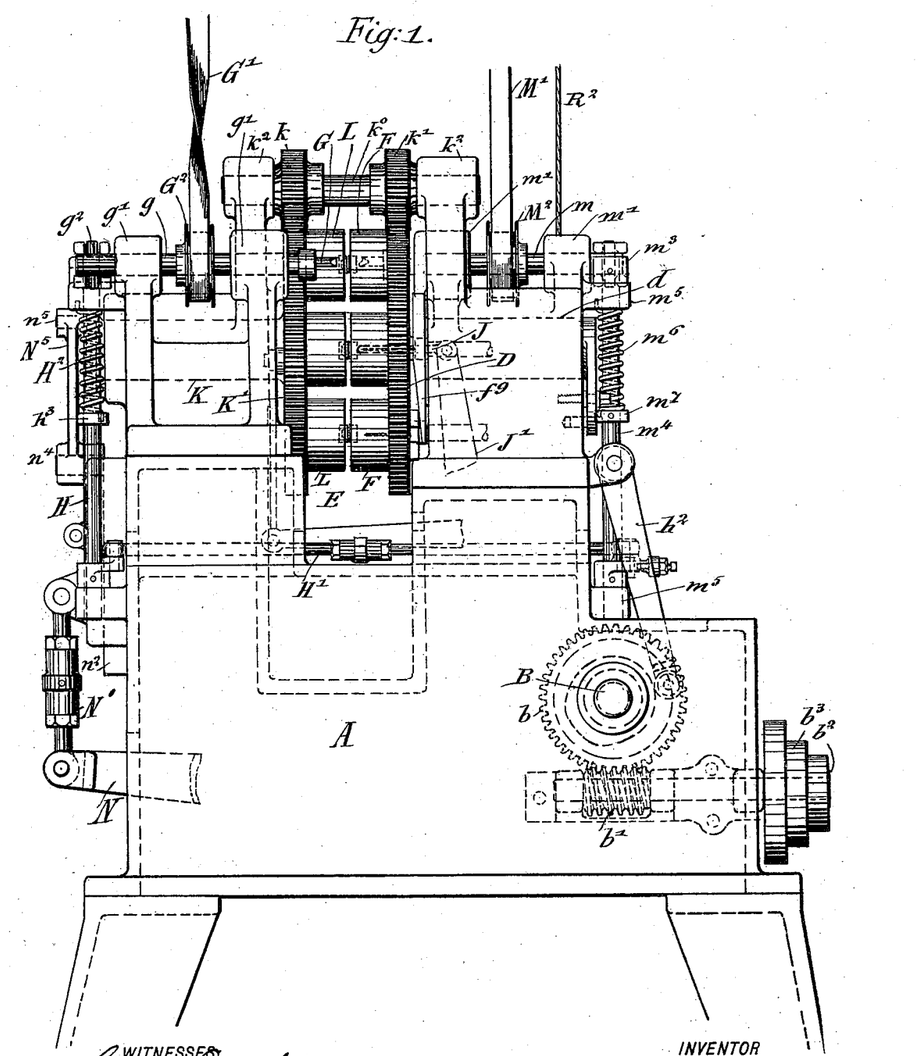
Figure 1 is a front elevation of my improved machine for turning buttons.
Figure 2:
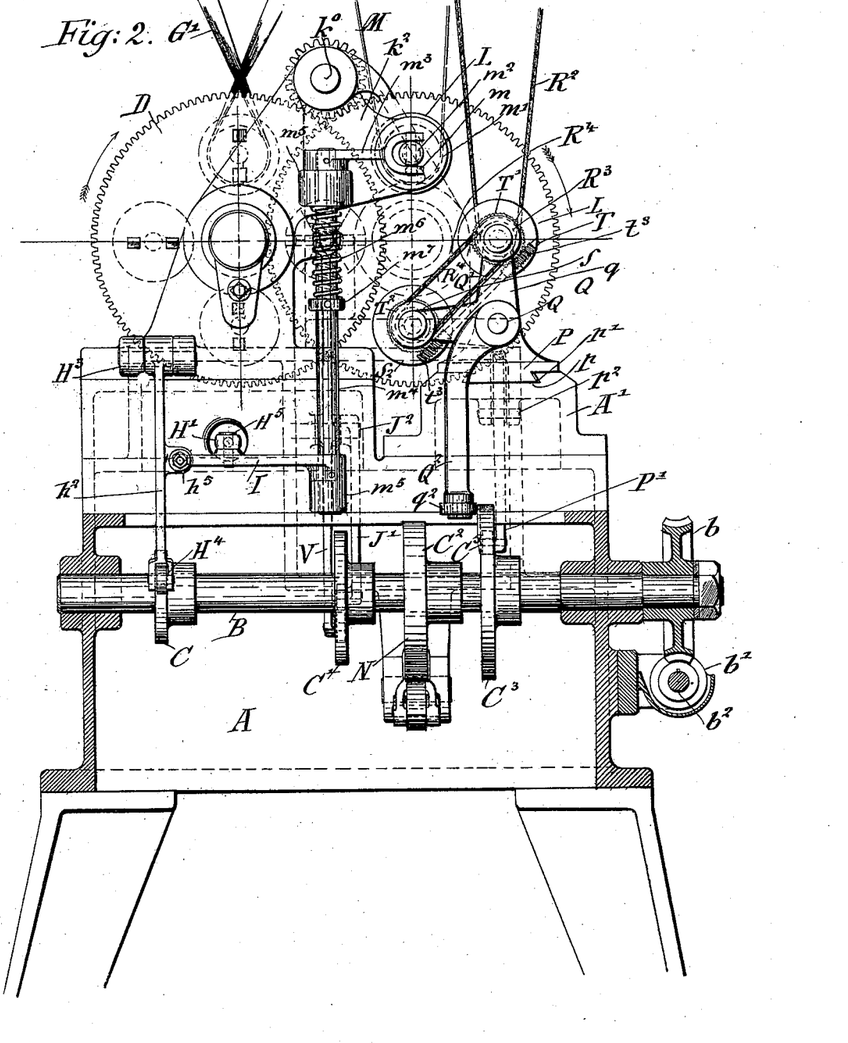
Fig. 2 is a side elevation of my machine, taken from that side on which the cam-shaft is located and partly in section to show the arrangement of the cams on the shaft.
Figure 4:
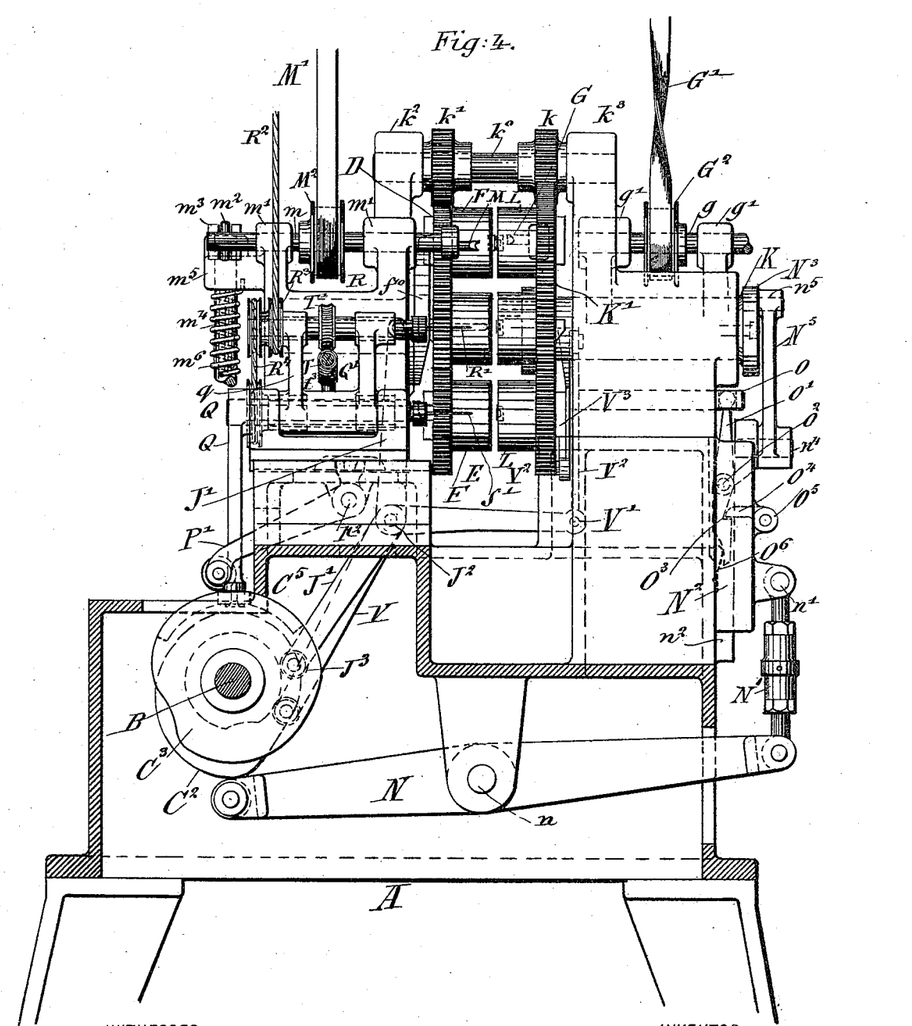
Fig. 4 is a rear elevation of the machine, partly in section.
Figure 5:
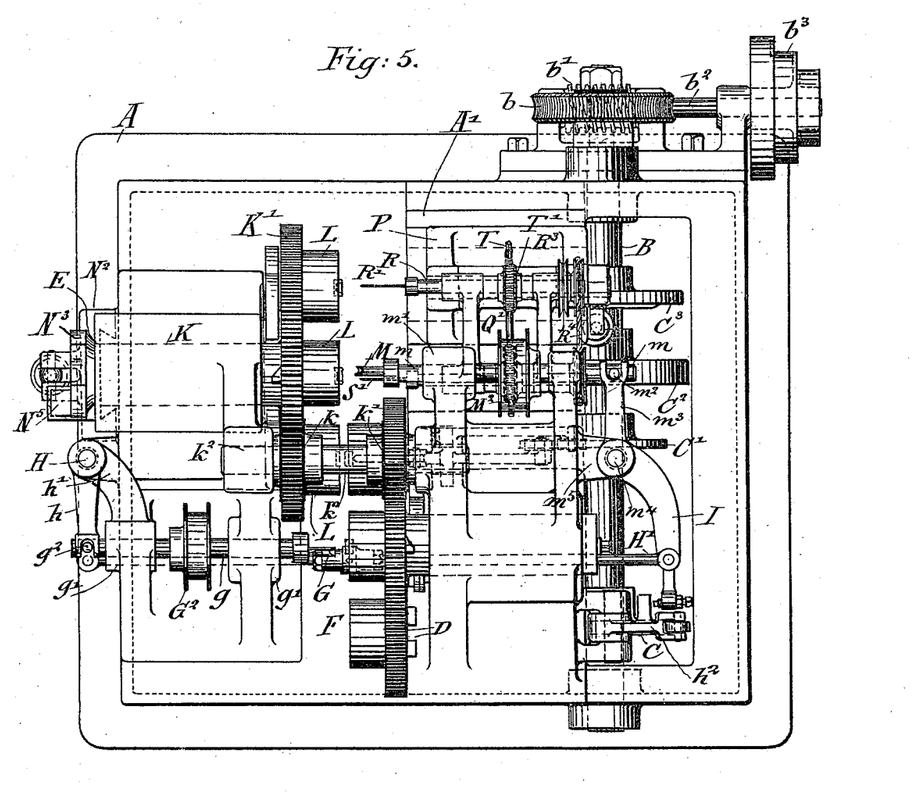
Fig. 5 is a plan view of the machine.

The relative shape of the effective portions of the respective cams is shown, partly in elevation and partly in dotted lines, in Fig. 4, and also in dotted lines in Fig. 12, while edge views of the cam may be seen in Fig. 2.

A button-blank is, when the machine is set in motion, placed in the outermost chuck of the rotary backing-head D at the moment that the gripping-jaws therein are opened by the action of the beveled actuating-piece $f^9$ engaging the beveled lug at the back thereof, and after a blank has been placed in the said chuck nearest the operator the machine is ready to be set into operation. The driving-shaft $b^2$ being now rotated, motion is communicated to the cam-shaft B through the medium of the worm-gear transmission $b'$ $b$. The cam C, acting upon the cam-lever $h^2$, will, through the medium of the oscillating arm I at one side of the machine and the oscillating arm $h^4$, connected therewith by the connecting-rod H', effectuate the oscillation of the vertical oscillating shafts H and $m^4$, so that a simultaneous inward movement is imparted to the shafts of the backing-cutter G and the facing-cutter M. The forward movement of the backing-cutter G effects, through the continuous rotation of the same, the planing or trimming off of the back portion of that button-blank which is in the chuck in line with the cutter, this cutting continuing until the operative portion of the cam C does not act upon the lever $h^2$, at which moment the springs H² and $m^6$, coiled upon the oscillating shafts H and $m^4$, effect the retraction of the backing-cutter and the facing-cutter.

At this moment the cam C², by reason of the conformation of its periphery, so affects the working of the lever N on which it acts that the parts actuated thereby are timed to so cause the rotation of the rotary heads of the backing and facing mechanisms that a new chuck is opened on the rotary head of the backing mechanism, as before, and a new blank may be inserted therein by the operator. As the lever N, which effects the intermittent rotation of the rotary heads, is depressed at one end by the cam C² its other end causes the slide N² to rise, so that, through the medium of the lateral pin on the actuating-arm N⁵, the star-wheel N³ is moved for one-fourth of a rotation. There are four teeth on the star-wheel N³, corresponding to the four chucks on the rotary head of the facing mechanism, but it is evident that the number of teeth on the star-wheel may be varied and must always correspond to the number of chucks which are on said rotary head. This one-fourth rotation of the star-wheel N³ imparts a similar movement to the rotary head K' of the facing mechanism, and, through the pinions meshing with the teeth thereof, to the rotary head D, so that one of the chucks L of said rotary head is brought in alinement with that chuck F of the rotary head of the backing mechanism which holds the blank which had just been backed by the backing-cutter, as before described, in which position the rotary heads are locked by the locking-pin O. When the described part rotation has been accomplished, and before another rotation is imparted to the rotary heads, the jaws of the chuck of the rotary head D, which holds the blank, will have been opened by the engagement of the beveled lug of the opening mechanism of the chuck with the fixed actuating-piece $f^{10}$. The plunger J, which is guided through the frame of the machine at one side of the axis of the rotary head D, is now moved forward through the medium of the cam C', which acts on the operating-lever J' of said plunger. As the hollow follower L³ of the alined chuck of the rotary head K' of the facing mechanism is normally projected forward by means of the spring J² when no button-blank is in said chuck, the button-blank in the alined chuck F is held between said projected follower L³ and the guide-pin F⁵, as shown in Fig. 6. Now as the plunger J is projected forward, as stated, it impacts against the rear end of the pin F⁵, so that through the outward movement of the latter and the following movement of the follower L³ (which is depressed against the action of its spring) the button-blank, which was up to this moment in the chuck F of the rotary head of the backing mechanism, is transferred from said chuck into the alined chuck L of the rotary head of the facing mechanism. Just before the plunger J is retracted the jaws or spring-fingers $f^\times$ of the alined chuck L of the rotary head of the facing mechanism are caused to exert their gripping action on the transferred and backed button-blank. This function, as well as that of first opening the gripping-jaws $f^×$, is accomplished also through the medium of the properly-timed actuating-cam C', which actuates the lever J², said cam acting also on the lower end of a lever V, that is also, like lever J', fulcrumed at J², which lever V is of bellcrank shape and is pivoted at its upper forward end at V' to the lower end of a pitman V², said pitman being at its upper end pivoted to one end of a plate V³, which is pivoted at its other end at V⁴ to the frame of the machine at a point under the axis of the rotary head K'. (See Fig. 8.) A cam-face V⁵ is formed at the inner side of the pivoted plate V³, and the latter or cam-plate is raised at the proper time to be brought in position for the depression of the beveled lug at the back of the chuck L and for thus opening the gripping-jaws $f^×$ to receive the backed blank when transferred, as before described. The reaction of the gripping-jaws $f^×$ takes place at the moment the cam-plate is raised again to compress the spring in alined chuck L, thus permitting the backed button-blank to be thereby firmly gripped in the said alined chuck. In order that the cam-plate V³ may be oscillated back to its original position, so that the same will permit the gripping-jaws of the chucks L to act at the proper moment, the spring of the bell-crank lever V acts upon the latter after the cam C' has rocked the same. Now during the interval of rest, while the described chucks F and L of the backing and facing mechanisms are in alinement, another blank is being backed by the cutter G, and when another fourth rotation is imparted to the rotary head K' the chuck L which was previously in alinement with one of the chucks M is rotated to the top of the said rotary head, so that the cutter M can produce or turn the face of the button, which, as before stated, is produced simultaneously with the backing of a button by cutter G. The facing of the button having now been accomplished and the movements heretofore described having been completed, another fourth rotation is imparted to the rotary head K' of the facing mechanism, so as to bring the first button backed and faced into position for having the eyes or perforations produced therein, while at the same time that the eyes or perforations are being made another button is being transferred from the backing mechanism to the facing mechanism. Now the operative parts of the drilling mechanism are so timed by reason of the conformation of the cam C³ thereof that the lever P' is rocked and the carriage P, which carries the drills, is reciprocated forwardly at the proper moment, and as the drill R' is continuously revolved by the transmitting-belt R² during the forward inward movement of the drill R' the perforation or eye is produced in the button which is in the chuck opposite the drill R'. Now while the rotary head K' of the facing mechanism is still at rest the carriage P is retracted and moved forwardly again, during which additional forward movement the rocking frame Q' is rocked on its axis or fulcrum Q so as to change the relative position of the drill R' to the backed and faced blank being operated on and produce two eyes arranged at one side of the center of the button-blank. This rocking of the rocking frame Q' at the proper moment is accomplished through the medium of the cam projection C⁵, that engages the lower end of the rocking lever Q². When the backed, faced, and two-eyed blank has been brought opposite the lower drill S, the continuous rotation of which is effectuated through the medium of the transmission-belt R⁴, four eyes will be produced in the button thereby for the reason that the one-fourth rotation of the rotary head K' changes the position of the two eyes formed in one side of the blank from horizontal when opposite the drill R to vertical when opposite the drill S, so that the additional two eyes formed by the drill S will be arranged on a line parallel with the line of the other two eyes. When another fourth rotation is imparted to the rotary head K', and hence to the rotary head D, the chuck which contains the first backed, faced, and perforated blank is brought into position for the releasing of the blank by the action of the cam-plate V³ on the beveled lug of chuck L, whereby the spring therein is compressed and the gripping-jaws allowed to open, this releasing of the so-formed blank being accomplished just before said chuck L is brought into alinement with one of the chucks M of the backing mechanism and just before a backed blank is transferred from the latter to the facing mechanism.

In a machine built and operated as above described, and with the cams so constructed as that the working mechanisms are properly timed to work at just the right moment, it is possible for the operator to introduce a button-blank into an open chuck F at the same time that a blank is being backed, the transferring of the button-blank from the backing to the facing mechanism, the facing of the blank, and the boring of the eyes into the faced and backed button-blanks are being accomplished.

It is evident to skilled mechanics that slight changes in the details of the construction and the working of the instrumentalities of my invention may be readily resorted to without departing from the spirit and scope thereof.

Having thus described my invention, I claim as new and desire to secure by Letters Patent—

1. The combination, with the backing mechanism and the facing mechanism, of a reciprocating carriage, a rocking frame mounted on said carriage and provided with the drills for producing the eyes in the buttons while they are held by the chucks of the facing mechanism, means for intermittently operating the backing and facing mechanisms, and means for reciprocating the carriage and rocking said rocking frame, substantially as set forth.

2. The combination, with the backing and facing mechanisms, of a reciprocating carriage, means for reciprocating said carriage, a rocking frame mounted on said carriage, and means for rocking said frame, a drill provided with a spindle journaled in said rocking frame, means for rotating said spindle, and means for holding one of the chucks of the facing mechanism with its contained blank in alinement with said drill, substantially as set forth.

3. The combination, with the backing mechanism and the facing mechanism, of the drilling mechanism, consisting of a reciprocating carriage, means for reciprocating the same, a rocking frame fulcrumed on said carriage and having an upright and horizontal portion, means for rocking said frame, a pair of drills provided with spindles journaled in the upright and horizontal portions of said rocking frame respectively, and means for revolving said drilling-tools, substantially as set forth.

4. The herein-described mechanism, consisting of a frame, the drills provided with spindles, a worm-shaft journaled in bearings on said frame, worm-wheels meshing with the worms of said shaft, and eccentric bushings or sleeves within bearings of the frame and on which the said worm-wheels are mounted, said spindles being located in said bushings for the adjustment of the alinement of the drills with the work to be operated on, substantially as set forth.

5. The chuck of the backing mechanism consisting of a shell or casing, a split tube screwed into the casing and formed with jaws beveled on their outer surfaces, a tubular slide guided in the casing outside of the tube and provided with a wedge-like end portion for engaging the outer bevels of the jaws, a spring arranged between the shell and slide and acting on the slide to close the jaws, a fixed guide-tube arranged in said split tube, a pin or plunger guided in said guide-tube and a spring in the guide-tube acting on said plunger, substantially as set forth.

In testimony that I claim the foregoing as my invention I have signed my name in presence of two subscribing witnesses.

JOSEPH BÖHM.

Witnesses:
WM. H. REED,
GEORGE W. JAEKEL.